United States Patent Office 3,817,745
Patented June 18, 1974

3,817,745
USE OF POLYMERIC COMPLEX FOR
RECOVERING METALS
Joseph P. Copes, Easton, Pa., and Donald H. Lorenz,
Basking Ridge, N.J., assignors to GAF Corporation,
New York, N.Y.
No Drawing. Filed Dec. 15, 1971, Ser. No. 208,424
Int. Cl. C07f 1/12; C22b 11/00
U.S. Cl. 75—108                                    10 Claims

ABSTRACT OF THE DISCLOSURE

A process for recovering noble metals from a solution containing noble metal ions by treating said solution with a complex of a cross-linked polymeric N-vinylamide and a polyhydroxyaryl compound.

---

This invention relates to improved means of removing noble metal ions from aqueous solutions thereof. It relates further to the use of insoluble polyhydroxyaryl complexes of a cross-linked N-vinylamide polymer to selectively remove noble metal ions from solution. It relates still further to the metal-containing-polymeric material formed by the reaction of the dissolved noble metal ions with said insoluble polyhydroxyaryl-cross-linked N-vinylamide complex.

It is in many instances quite important to remove metal ions from solutions. Precious metals, such as gold and silver, are in widespread commercial use in plating and photographic processes which produce large quantities of noble metal-containing waste waters. Dissolved noble metals are also present in processing waters used for the benefication of both noble and base metal ores, and in sea water and natural fresh water streams. In all of these instances, the noble metal is present in ionized form and in very low concentration. In certain other instances, noble metals are suspended in either a solid or liquid substrate which also contains other suspended materials of less value and, even when these conditions may not obtain, it is sometimes extremely difficult to filter out the precipitated or hydrolyzed metals.

In view of the value of noble metals, it is important to recover them, but it is often difficult to do so because of the extremely low concentration of the noble metal ion and the tendency of other materials to be separated out along with the noble metal and thereby contaminate the recovered product.

Accordingly, it is an object of the present invention to provide a means of recovering the noble metals.

It is a further object of the present invention to provide a process whereby noble metals can be efficiently recovered from solutions containing low concentrations of ionized noble metals in the presence or absence of certain other ionized materials.

It is a further object of the present invention to treat dilute solutions containing noble metal ions with an insoluble cross-linked polymer complex capable of reducing the noble metal ions to elemental metals deposited on said complex.

It is a still further object of the present invention to provide the metal-containing insoluble cross-linked product produced by the above process.

These and other objects are accomplished in accordance with the present invention by treating a solution containing noble metal ions with the complex of a cross-linked polymeric N-vinyl-amide and a polyhydroxyaryl compound. The complex causes reduction of the dissolved noble metal ions to the elemental state, causing deposition of elemental noble metal on the surface of the complex. The noble metal content of the metal-containing complex can be recovered by treatment of the metal-containing complex with an acid which dissolves the noble metal without substantially modifying the complex itself. Alternatively, the metal can be recovered by destruction of the complex with heat, for example, leaving the metal remaining behind in finely-divided form.

The complexes which are useful in the present invention are derived from polymers prepared by polymerization of an N-vinylamide in the presence of a poly-unsaturated cross-linking agent and a free radical promoting catalyst. The N-vinylamide may be cyclic, i.e., an N-vinyllactam or, acyclic, i.e., an N-alkyl-N-vinylamide.

Useful N-vinyllactams are represented by the general formula (I):

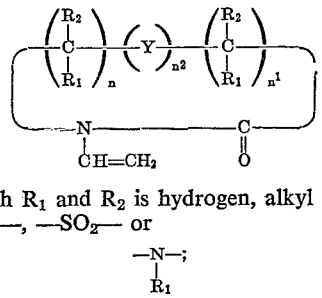

wherein each $R_1$ and $R_2$ is hydrogen, alkyl or aryl; Y is —O—, —S—, —SO$_2$— or

$n$ and $n^1$ are whole numbers in the range of 0 to 6, and $n^2$ is 0 to 1, provided that the sum of $n$, $n^1$ and $n^2$ is at least 3.

These N-vinyllactams can be prepared, for example, by the vinylation of lactams following the procedures disclosed in U.S. Pats. 2,265,450; 2,317,084; 2,334,454; 2,891,058; and 3,097,087. Representative useful N-vinyl lactams are N-vinyl-substituted derivatives of the following lactams: 2-pyrrolidone, 3,3-dimethyl-2-pyrrolidone, 4,4-dimethyl-2-pyrrolidone, 3,4 - dimethyl-2-pyrrolidone, 3-ethyl-2-pyrrolidone, 3,5 - dimethyl - 2 - pyrrolidone, 3-phenyl-2-pyrrolidone, 4-acryl-2-pyrrolidone, 5-ethyl-2-pyrrolidone, 3-methyl-2-pyrrolidone, 4-methyl-2-pyrrolidone, 5-methyl-2-pyrrolidone, 3,3,5-trimethyl-2-pyrrolidone; 2-piperidone, 5,5-diethyl-2-piperidone, 5,6-dimethyl-2-piperidone, 4-ethyl - 2 - piperidone, 6-ethyl-2-piperidone, 6-ethyl-3-methyl-2-piperidone, 3-methyl-2-piperidone, 4 - methyl - 2 - piperidone, 5-methyl-2-piperidone, 6-methyl - 2 - piperidone; 2-caprolactam 3,6-dimethyl-2-caprolactam, 4,6-dimethyl-2-caprolactam, 4,7-dimethyl-2-caprolactam, 7,7 - diethyl - 2 - caprolactam, 3-ethyl-2-caprolactam, 5-ethyl-2-caprolactam, 6-ethyl-2-caprolactam, 7-ethyl-2-caprolactam, 4-ethyl - 6 - methyl-2-caprolactam, 6-ethyl - 4 - methyl - 2 - caprolactam, 3-methyl-2-capolactam, 4-methyl-2-caprolactam, 5-methyl-2-caprolactam, 6-methyl-2-caprolactam, 3H-1, 4-oxazine-3-one, 2-phenyl-4-oxathiazolidone, 2,2' - diphenyl-4-oxathiazolidone, 2,2'-dimethyl-4-oxathiazolidone; 3-oxazolidonone, 5-methyl-2-oxazolidonone, 4-methyl - 2 - oxazolidinone, 5-ethyl-2-oxazolidinone, 4,5-dimethyl - 2 - oxazolidinone, 2-phenyl-2-oxazolidinone, 5-butyl-2-oxazolidonone, 5-propyl-2-oxazolidinone, 4,5-diethyl - 2 - oxazolidinone; 2,4-oxazolidinedione; 3-morpholone, 5-methyl-3-morpholone, 5-ethyl-3-morpholone, 3,5 - dimethyl - 3 - morpholone; 2-piperazinone, 3,3-dimethyl-2-ketopiperazine, 3-methyl-2-ketopiperazine; 4-thiazolidone, 2-methyl-4-thiazolidinone; 2-phenyl - 4 - thiazolidinone; 2-phenyl-4-thiazolidinone dioxide; 2-thiazolidone; 3-thiamorpholinone; 2-pyrimidone; 2 - imidazolidones; N,N' - ethylenethioureas; tetra-hydro(2H,1,3)-oxazin-3-ones; and the like.

Suitable N-alkyl-N-vinylamides are those which correspond to the formula (II):

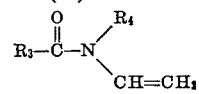

wherein $R_3$ is hydrogen or an alkyl radical of 1 to 4, and preferably 1 to 2, carbon atoms and $R_4$ is an alkyl of 1 to 4, and preferably 1 to 2, carbon atoms.

Such N-alkyl-N-vinylamides are described in U.S. Pat. 3,214,370. Among representative amides are: N-butyl-N-vinylacetamide, N-methyl-N-vinylpropionamide, N-methyl-N-vinylpentanoic acid amide, N-methyl-N-vinylformamide and the like.

The porous granular or bead form of the polymer is produced from a suspension polmerization system wherein the N-vinyl-lactam or N-alkyl-N-vinylamide monomer, with optional copolymerizable monomer and cross-linking agent is polymerized in the presence of a free-radical polymerization promoter in an aqueous solution of an electrolyte, the suspension being maintained during polymerization by mechanical agitating means.

Polymerization of the N-vinyllactam or N-alkyl-N-vinylamide with about 0.1% to about 20%, based on the weight of the former, of cross-linking agent, i.e., divinyl monomer, is carried out in an aqueous solution of an electrolyte, the concentration of electrolyte being high enough to produce phase separation before or during polymerization. Any suitable electrolyte, generally in about 10–20% aqueous solution, may be employed, preferably alkali metal (e.g. Na, K) chlorides, bromides, phosphates, nitrates, and particularly sulfates such as sodium sulfate. Since the monomers polymerized in accordance with this procedure are not very soluble in such electrolyte solutions, by using more than enough monomers to saturrate the solution of electrolyte, a suspension of the excess monomers can be made through mechanical agitation. The use of excess undissolved salt is often beneficial since the solid becomes enmeshed in the bead or granule, and upon dissolution, increases the surface area of the porous product.

The proportion of total monomer to water should not exceed about 80% monomer, preferably about 50% monomer based upon the weight of the water since higher monomer concentrations may cause hot spots and particle agglomeration. The lower limit of monomer may be as low as 1% monomer, but is preferably not lower than 10% monomer based on the weight of the water in the aqueous electrolyte system since lower concentrations of monomer lead to no beneficial result whereas they involve large volumes of reactants and the need for large capacity reactors.

The polymerization process is conducted in the presence of a catalyst which provides a source of free radicals. Any conventional free radical catalyst generally employed in vinyl polymerizations can be employed in accordance with the process of the present invention, such catalysts being added either to the mixture of monomers or to the aqueous solution of electrolyte. Thus, for example, the catalyst can comprise any of the conventional peroxide catalysts, e.g., benzoyl peroxide, di-t-butyl peroxide, as well as the preferred azo catalysts, e.g., azobisisobutyronitrile.

The cross-linking agents which are suitably employed in the preparation of the cross-linked polymer are those which contain two or more functional groups capable of taking part in the polymerization reaction so as to provide a polymeric product having a cross-linked or three dimensional structure. Cross-linking agents that have been found particularly applicable in accordance with the present invention are the alkylenebisacrylamides, e.g. N,N'-methylenebisacrylamide, the alkylene glycol dimethacrylates, e.g., ethylene glycol dimethacrylate, diethylene glycol dimethacrylate, tetra-ethylene glycol dimethacrylate, higher polyethylene glycol dimethacrylate, 1,3- and 1,4-butanediol diacrylates and dimethacrylates, etc., and the divinyl aromatic compounds, e.g., divinyl benzene, divinylethylbenzene, divinylchlorobenzene, divinyltoluene, divinyl naphthalene, etc. Other suitable cross-linking agents include allyl acrylate, p-isopropenylstyrene, diallyl maleate, divinyl ether, 1,3- or 1,4-divinyl-oxybutane, trivinyl citrate, divinyl o-phenylene diacetate, vinyl allyl ether, diethylene glycol diallyl ether, trivinyl glyceryl ether, divinyl glyceryl ether, tetravinyl pentaerythrityl ether, hexahydro-1,3,5-triacryl-s-triazine, hexahydro - 1,3,5-trimethylacryl-s-triazine and the like. Additionally, mixtures of these cross-linking agents can be employed, where desired. The cross-linking agent is generally employed in an amount of from about about 0.1% to about 20% by weight, based upon the weight of the N-vinyl lactam or N-alkyl-N-vinylamide monomer. About 3% to 5% of the cross-linking agent is preferred.

The N-vinyl lactam or N-alkyl-N-vinylamide can be polymerized in the presence of an optional copolymerizable monomer. Preferably, no more than about 50%, and more preferably no more than about 20% of such copolymerizable monomer should be present, based on the weight of the N-vinyl lactam or N-alkyl-N-vinylamide monomer.

Examples of comonomers which can be employed are the N-vinyllactams of N-alkyl-N-vinylamides, $C_1$–$C_4$ alkyl acrylates or methacrylates, $C_1$–$C_{18}$ alkyl vinyl ethers, e.g., methyl vinyl ether and ethyl vinyl ether, acrylamide, acrylic acid, acrylonitrile, allyl acetate, allyl alcohol, crotonic acid, dimethylaminoethylvinyl sulfide, diethylhexyl maleate, didodecyl maleate, furmaramide, itaconic acid, methacrylic acid, methacrylamide, methoxy-styrene, methyl vinyl ketone, 2-methyl-N-vinylpyrrolidone, 2-methyl-5-vinylpyridine, styrene, trichloroethylene, vinyl carbazole, vinylamidazole, vinyl stearate, vinyl laurate, vinyl methyl benzimidazole, vinyl-methyl-dichlorosilane, vinylmethyloxazolidinone, vinyloxyethylurea, vinyl propionate, vinyl pyridine, vinyl siloxanes, vinyl acetate (and the derived vinyl alcohol).

The polymerization process may be carried out by adding all of the monomers at once to the salt solution or the monomers may be added in gradually during the polymerization. The polymerization is usually carried out at about 50 to 80° C. and requires a relatively short time for completion, e.g., about two to six hours.

The above-described cross-linked polymeric N-vinyllactams or N-alkyl-N-vinylamides are complexed with phenolic compound having at least two hydroxy groups located on a 6 membered carbocyclic aromatic ring. Such phenolic materials are exemplified by:

resorcinol
hydroquinone
phloroglucinol
gallic acid
1,2-dihydroxynaphthalene
1,4-dihydroxynaphthalene
pyrogallol
pyrocatechol
2,4-dihydroxy benzophenone
2,2',4,4'-tetrahydroxy benzophenone
hydroxyquinol The complexes are readily formed by contacting the cross-linked N-vinyllactam or N-alkyl-N-vinylamide polymers with one of the phenolic compounds described above. The phenolic compound may be dissolved in an aqueous solvent and the complexing reaction hastened by stirring and heating the reaction mixture. The proportion of phenol to polymer should be in the range of about 0.05 to 0.2 mole or more phenol per mole of polymer because it has been found that only about 10% of the lactam present enters into complex formation with the phenol.

After a suitable time, as can be determined by analysis of the product, it may be washed with water and dried in a vacuum to give the complexes which can be used in the present invention.

The term "noble metals" as used in the present invention is intended to embrace silver, gold, platinum, palladium, osmium, irridium, rhodium and ruthenium.

The process of the present invention can be practiced by establishing a contact zone in which a solution containing noble metal ions is brought into contact with the polymeric complex. Since the complexes are quite insoluble and only slightly swellable in aqueous menstrums, they can be charged into a column which can then be used to remove noble metal ions from solutions passed therethrough. Generally the complexes will remove about one equivalent of metal ions for each equivalent of complex. More specifically, the amount of noble metal ions removed from solutions depends upon the polyhydroxyaryl content of the complexes. In general, each equivalent of the polyhydroxyaryl compound will remove one equivalent of the noble metal.

Thus, the present invention provides means for removing noble metal ions from solution. The source of the ions is not critical and, in fact, the complexes can remove noble metals from a wide variety of liquid substrates containing dissolved noble metal compounds. Thus, waste photographic solutions containing dissolved silver compounds can be passed through a bed of the complex with almost quantitative removal of the silver ions therefrom. The complexes can likewise be used to selectively remove noble metal ions from ore processing solutions containing such ions along with other base metal ions. The complexes can also be used to treat industrial waste waters, fresh water from natural streams, as well as brackish or salt water and any other water containing noble metal ions, all at from acid to alkaline pH, to selectively remove and isolate the noble metal content thereof.

The poly (N-vinyllactam)-polyhydroxyaryl complexes, after being used to remove noble metal ions from solution, become impregnated with the elemental metal corresponding to the ions in the treated solution. On certain occasions it was observed that there was a corresponding oxidation of the polyfunctional phenol together with desorption of the oxidized phenol from the polymeric material. The metal impregnated matrices, possibly zero valent complexes, can be used in a variety of ways. They can be treated with a strong acid or in many case, aqua regia, or other suitable reagent or solvent whereby the elemental metal content of the complex is dissolved and the resultant, pure, and much more concentrated solution of the metal salt can be treated for recovery of the metal or used as such for various industrial applications. For example, if the noble metal is silver and nitric acid is used to remove it from the complex, the resultant silver nitrate can be used, as is well known in photographic preparations or electroplating processes, or alternatively, the silver nitrate can be converted to silver for recovery of the metal itself. After removal of the metal, the polymeric material can be retreated with polyhydroxyaryl compounds by the same procedure used to originally form the complex, and then it can be re-used to remove noble metal ions from solution.

Alternatively, the noble metal impregnated complexes produced by treating solutions containing such metal ions, can be used, as such, to catalyze reactions such as hydrogenation of olefinic or acetylenic carbon to carbon bonds, the reduction of aldehydes to alcohols, the isomerization of various hydrocarbons. Isomerization with these catalysts yields stereo-specific results in some cases.

The following examples are presented to further illustrate the present invention.

EXAMPLE 1

A complex was prepared by admixing 11.193 gms. of dry polyvinylpyrrolidone (PVP) beads and 250 cc. of 5% aqueous hydroquinone in a beaker and stirring for four hours. The PVP beads measured about 0.75 mm. in diameter and were prepared by copolymerizing vinyl pyrrolidone in the presence of 5% of divinylbenzene, a cross-linking agent, and azobisisobutyronitrile, a free radical polymerization catalyst. The resultant complex was washed with water five times and dried in a vacuum oven at 40° C. and 30 mm. Hg. When dry the complex weighed 12.33 gms., indicating a complexed hydroquinone content of 0.102 gm. per gram of starting beads on the dry basis.

This example shows one way to produce a complex for use in the present invention. The drying and weighing steps may be omitted for convenience, if desired.

EXAMPLE 2

The beads from Example 1 were slurried with 50 ml. of water and 1% aqueous silver nitrate was added in increments, stirring for one minute after each addition until a positive silver ion test was obtained in the supernatant liquid via a weak sodium chloride solution. It was determined that 165 ml. of the silver nitrate solution was required to obtain a positive silver ion test. This indicates that the silver from 1.65 gms. of silver nitrate was extracted from the solution by the 12.33 gms. of treated beads.

The silver-impregnated beads were washed well with water, dried and the X-ray pattern obtained. The X-ray pattern indicated the presence of metallic silver and no silver ions.

Some of the silver-impregnated beads were burned in a crucible. A residue of spongy silver metal was found in the crucible, which became bright when burnished with a polished glass rod.

The supernatant liquid covering the beads was found to have a pH of 1 showing that nitric acid was liberated during the collection of silver by the beads.

Following the procedures of the foregoing example, a solution of palladium chloride dihydrate ($PdCl_2 \cdot 2H_2O$) was treated with an excess of the beads produced in Example 1. Palladium ions were completely removed from solution and the beads were found to be coated and impregnated with palladium metal.

EXAMPLE 3

A solution was prepared by dissolving a small amount of $HAuCl_4 \cdot H_2O$ in water. This solution was brought into contact with hydroquinone-PVP complex beads prepared as in Example 1. After stirring, collecting the beads, washing, and drying: the beads were analyzed and found to contain 6.5% gold. Gold metal was recovered by burning a portion of the beads. This gold was a dull fluff which developed the gold luster when compacted and rubbed with a polished spatula. Another portion of the beads was treated with aqua regia and the resulting gold solution was evaporated and heated to its decomposition temperature to recover the gold metal. It was observed that the beads were not damaged by the treatment with aqua regia and could be recycled for further metal recovery after retreatment with hydroquinone as in Example 1.

EXAMPLE 4

A 5% solution of chloroplatinic acid in water weighing 6.80 gms. was brought into contact with 2 gms. of hydroquinonepolyvinylpyrrolidone beads produced as in Example 1. The mixture was stirred for 4 hours, washed with water by decantation, and the beads collected and weighed. The dried beads weighed 2.12 gms. showing that platinum metal had been picked up by the beads. The beads, practically black due to the deposition of platinum metal, were treated with an excess of aqua regia. In a few minutes, the beads lost the black color and became as light as they were originally. The metal, which dissolved in aqua regia, was recovered by calcining. Again, treatment with aqua regia did not affect the physical form of the beads.

EXAMPLE 5

Ten grams of dry PVP beads prepared by polymerizing N-vinylpyrrolidone in the pesence of 5% of divinyl benzene and azobisisobutyronitrile, a free radical catalyst, were soaked in an excess of 5% pyrogallol solution for several hours, and then were drained, washed and dried.

The dried beads weighed 12.287 gms., showing that the beads had picked up 2.287 gms. of pyrogallol.

EXAMPLE 6

This example shows that pyrogallol complexed on the beads is able to completely exhaust (and reduce at acid pH) silver in the same manner as the hydroquinone complexed beads.

Five grams of the beads prepared in Example 5 were treated with 150 ml. of a 1% solution of silver nitrate in water, added in increments. The supernatant liquid which has a pH of 1.2 was tested for silver with negative results. After washing and drying the beads, there were recovered 5.39 grams of beads. When a portion of the beads was burned 17.6% of silver based on the total weight of the beads, was left in the crucible.

EXAMPLE 7

This example shows the re-use of the polyhydroxyaryl-poly(n-vinyllactam) complexes for removal of metal from solutions. Some of the silver impregnated beads obtained in Example 2 were treated with 35% nitric acid and the sliver dissolved off the beads.

The beads were then washed, dried and retreated with hydroquinone as shown in Erample 1. The hydroquinone pickup was greater than 0.102 gms. per gram of bead. These beads were then used to remove silver again from a silver nitrate solution as described in Example 2 and again silver was removed from solution and deposited on the beads.

EXAMPLE 8

A modicum of palladous chloride was dissolved in dilute hydrochloric acid and the solution was brought into contact with PVP-pyrogallol complex beads described in Example 5. Palladium began to be deposited on the beads immediately, and recovery was complete in 8 hours. The beads were analyzed and found to contain 5% Pd.

EXAMPLE 9

Following the procedure of Example 8, a solution of palladous chloride was treated with beads prepared in accordance with the procedure of Example 1. Deposition of metal onto the beads began immediately. After 24 hours, the beads were washed, dried, and weighed, showing that the removal of palladium ions from solution was almost quantitative.

EXAMPLE 10

Following the procedure of Example 9, rhodium nitrate was dissolved in water and the solution was treated with the beads described in Example 1. The removal of rhodium ions from solution was almost quantitative.

EXAMPLE 11

A copolymer of vinylpyrrolidone and ethylene (50:50) was pressed into film form. The fim was immersed in a diute aqueous solution of hydroquinone and found to pick up about 10% of its weight of hydroquinone. The complex copolyer film was treated with a 1% silver nitrate solution for 24 hours. A fine deposit of silver formed on the film indicating the removal of silver ions from solution.

EXAMPLE 12

Artificial sea water (Turks Island) was prepared by adding the following salts to 95 liters of water:

| | Gm. |
|---|---|
| Sodium chloride (NaCl) | 2815 |
| Potassium chloride (KCl) | 67 |
| Magnesium chloride (MgCl$_2$·6H$_2$O) | 551 |
| Magnesium sulfate (MgSO$_4$·7H$_2$O) | 692 |

To a portion of this, sufficient gold chloride was added to form a solution containing about 0.1% gold. This solution was stirred with beads prepared as in Example 1 for two days. The solution was then separated from the beads and evaporated to dryness. The remaining salts and the beads were examined separately by atomic absorption spectroscopy. No traces of gold were observed to be present in the residual salts; however, gold was positively on the beads.

What is claimed is:

1. A process of recovering noble metals from a solution containing noble metal ions which comprises treating such a solution with a complex of a cross-linked polymeric N-vinylamide and a polyhydroxyaryl compound wherein said vinylamide is selected from the group consisting of N-vinyl lactam represented by the formula

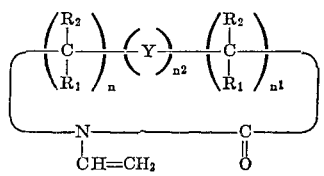

wherein each $R_1$ and $R_2$ is hydrogen, alkyl or aryl; Y is —O—, —S—, —SO$_2$— or

$n$ and $n^1$ are whole numbers in the range of 0 to 6, and $n^2$ is 0 to 1, provided that the sum of $n$, $n^1$ and $n^2$ is at least 3, and N-alkyl-N-vinylamide represented by the formula

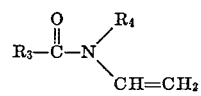

wherein $R_3$ is hydrogen or an alkyl radical of 1 to 4, and preferably 1 to 2, carbon atoms and $R_4$ is an alkyl of 1 to 4, said polyhydroxyaryl compound is selected from the group of
 resorcinol
 hydroquinone
 phloroglucinol
 gallic acid
 1,2-dihydroxynaphthalene
 1,4-dihydroxynaphthalene
 pyrogallol
 pyrocatechol
 2,4-dihydroxy benzophenone
 2,2',4,4'-tetrahydroxy benzophenone, and
 hydroxyquinol
and said cross-linking agent is a compound containing two or more functional groups capable of taking part in the polymerization reaction so as to provide a polymeric product having a cross-linked or three-dimensional structure, and recovering the metal ions in their metallic state from said complex.

2. The process of claim 1 wherein the N-vinylamide is an N-vinyllactam.

3. The process of claim 1 wherein the N-vinylamide is an N-alkyl-N-vinylamide.

4. The process of claim 1 wherein $n^2$ is 0 and $n$ and $n^1$ are each 1.

5. The process of claim 1 wherein the polyhydroxyaryl compound is hydroquinone.

6. The process of claim 5 wherein the cross-linked polymeric N-vinylamide is poly(vinylpyrrolidone).

7. The noble metal-impregnated product produced by the process of claim 1.

8. The process of claim 1 wherein the polyhydroxyaryl compound is pyrogallal.

9. The process of claim 8 wherein the cross-linked polymeric N-vinylamide is poly(vinylpyrrolidone).

10. The process according to claim 1 wherein the solution is sea water.

References Cited

UNITED STATES PATENTS

| 3,317,313 | 5/1967 | Büggs et al. | 75—118 |
| 3,242,152 | 3/1966 | Goren | 75—108 |
| 2,945,757 | 7/1960 | Hoekstra | 75—108 |

OSCAR R. VERTIZ, Primary Examiner

H. S. MILLER, Assistant Examiner

U.S. Cl. X.R.

75—118, 121; 260—430